US010172222B2

(12) United States Patent
Bhageria et al.

(10) Patent No.: US 10,172,222 B2
(45) Date of Patent: Jan. 1, 2019

(54) UTILITY LIGHT MALFUNCTION DETERMINATION

(71) Applicant: INTERNATIONAL BUSINESS MACHINES CORPORATION, Armonk, NY (US)

(72) Inventors: Gopal K. Bhageria, Overland Park, KS (US); Vijay Ekambaram, Tamilnadu (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 15/079,354

(22) Filed: Mar. 24, 2016

(65) Prior Publication Data

US 2017/0280539 A1 Sep. 28, 2017

(51) Int. Cl.
*H05B 37/03* (2006.01)
*G01J 1/58* (2006.01)
(Continued)

(52) U.S. Cl.
CPC .............. *H05B 37/03* (2013.01); *G01J 1/58* (2013.01); *G05D 1/0011* (2013.01);
(Continued)

(58) Field of Classification Search
CPC ......... H05B 37/03; G01J 1/58; G05D 1/0011; G06Q 10/06311; G06T 7/0008; G06T 2207/10016; G06T 2207/30108
(Continued)

(56) References Cited

U.S. PATENT DOCUMENTS

2007/0057807 A1* 3/2007 Walters .................. G06Q 30/04
340/7.29
2010/0167722 A1* 7/2010 Madhavan ............ H04W 76/18
455/426.2
(Continued)

OTHER PUBLICATIONS

Motta, Gianmario et al.; City Feed: a Crowdsourcing System for City Governance; 2014 IEEE 8th International Symposium on Service Oriented System Engineering; Apr. 7-11, 2014; pp. 439-445.
(Continued)

*Primary Examiner* — Tuan C To
(74) *Attorney, Agent, or Firm* — Schmeiser, Olsen & Watts; Mark C. Vallone (57) ABSTRACT

A method and system for automatically determining a utility light malfunction is provided. The method includes receiving, from a first hardware device, luminance data specifying current luminance levels associated with utility light apparatuses. Location data specifying a geographical location for each utility light apparatus is retrieved and the luminance data and location data are analyzed with respect to historical luminance data and historical location data associated with the utility light apparatuses. The analysis results in determining that a group of utility light apparatuses include first current luminance levels differing from previous luminance levels of the group. A list and associated map specifying a group of geographical locations associated with the group is generated. A control signal enabling control of a vehicle is transmitted to the vehicle and associated video data is retrieved via the vehicle during travel in accordance with the map.

20 Claims, 4 Drawing Sheets

(51) Int. Cl.
*G06Q 10/06* (2012.01)
*G05D 1/00* (2006.01)
*G06T 7/00* (2017.01)

(52) U.S. Cl.
CPC ...... *G06Q 10/06311* (2013.01); *G06T 7/0008* (2013.01); *G06T 2207/10016* (2013.01); *G06T 2207/30108* (2013.01)

(58) Field of Classification Search
USPC .......................................................... 701/2
See application file for complete search history.

(56) References Cited

U.S. PATENT DOCUMENTS

| | | | | |
|---|---|---|---|---|
| 2010/0316252 | A1* | 12/2010 | Burgoa Roman | B60Q 1/085 382/100 |
| 2013/0102333 | A1* | 4/2013 | Dam | G06Q 10/0631 455/457 |
| 2013/0253831 | A1* | 9/2013 | Langendorff | G01C 21/3682 701/533 |
| 2014/0081998 | A1* | 3/2014 | Fan | G06Q 10/10 707/754 |
| 2014/0244166 | A1* | 8/2014 | Klancher | H02J 13/0075 701/515 |
| 2015/0035437 | A1 | 2/2015 | Panopoulos et al. | |
| 2015/0035686 | A1* | 2/2015 | Frish | G08G 1/07 340/907 |
| 2017/0227596 | A1* | 8/2017 | Sozer | G01R 31/085 |
| 2017/0256153 | A1* | 9/2017 | Klein | H02J 13/0075 |

OTHER PUBLICATIONS

Jennings, Savannah et al.; Analyzing Drone Footage to Assess Necessary Streetlight Placement: Where in New Washington Heights and Poe Mill are Streetlights Most Necessary? Furman University Scholar Exchange; Dec. 4, 2014; 2 pages.

Q-Free; New technology will lead to big changes in traffic monitoring and road safety; URL: https://www.q-free.com/about/new-technology-will-lead-to-big-changes-i . . . ; Retrieved from the Internet Jan. 5, 2016; 2 pages.

Glendale, AZ; Engineering-Street Lights-Street Light Monitoring System; URL: https://www.glendaleaz.com/transportation/streetlights/streetlightmonitor . . . ; Retrieved from the Internet Jan. 5, 2016; 1 page.

Rutkin, Aviva; Drones cleared to check power lines after outages; New Scientist Magazine, Issue 3014; Mar. 28, 2015; 4 pages.

Mitchell, Shane et al.; The Internet of Everything for Cities; Cisco; 2013; 21 pages.

Crabb, Timothy R.; Automated Street Light Monitoring System; College Station Utilities; May 2010; 26 pages.

* cited by examiner

UTILITY LIGHT MALFUNCTION DETERMINATION

FIELD

The present invention relates generally to a method for managing utility light outages and in particular to a method and associated system for confirming and automatically repairing utility light outages.

BACKGROUND

Manually determining apparatuses in need of repair typically includes an inaccurate process with little flexibility. Manually determining locations associated with apparatuses in need of repair typically involves an unreliable process. Automatically controlling and directing various repair techniques with respect to apparatuses in need of repair may include a complicated process that may be time consuming and require a large amount of resources. Accordingly, there exists a need in the art to overcome at least some of the deficiencies and limitations described herein above.

SUMMARY

A first aspect of the invention provides a utility light malfunction determination method comprising: receiving , by a processor of a computing device from a first hardware device, luminance data specifying current luminance levels associated with a plurality of utility light apparatuses; receiving, by said processor from said first hardware device, location data specifying a geographical location for each utility light apparatus of said plurality of utility light apparatuses; analyzing, by said processor, said luminance data and said location data with respect to historical luminance data and historical location data associated with said plurality of utility light apparatuses; determining, by said processor based on results of said analyzing, a group of utility light apparatuses of said plurality of said utility light apparatuses comprising first current luminance levels differing from previous luminance levels of said group of said utility light apparatuses retrieved from said historical luminance data; generating, by said processor, a list specifying a group of geographical locations associated with said group of said utility light apparatuses; generating, by said processor based on said list, a map comprising said group of geographical locations; transmitting, by said processor to a vehicle in response to said generating said map, a control signal enabling control of said vehicle such that said vehicle initiates motion and navigates towards said group of geographical locations in accordance with said map; and retrieving, by said processor via said vehicle during travel in accordance with said map, video data associated with said group of said utility light apparatuses.

A second aspect of the invention provides a computer program product, comprising a computer readable hardware storage device storing a computer readable program code, said computer readable program code comprising an algorithm that when executed by a processor of a computing device implements a utility light malfunction determination method, said method comprising: receiving , by said processor from a first hardware device, luminance data specifying current luminance levels associated with a plurality of utility light apparatuses; receiving, by said processor from said first hardware device, location data specifying a geographical location for each utility light apparatus of said plurality of utility light apparatuses; analyzing, by said processor, said luminance data and said location data with respect to historical luminance data and historical location data associated with said plurality of utility light apparatuses; determining, by said processor based on results of said analyzing, a group of utility light apparatuses of said plurality of said utility light apparatuses comprising first current luminance levels differing from previous luminance levels of said group of said utility light apparatuses retrieved from said historical luminance data; generating, by said processor, a list specifying a group of geographical locations associated with said group of said utility light apparatuses; generating, by said processor based on said list, a map comprising said group of geographical locations; transmitting, by said processor to a vehicle in response to said generating said map, a control signal enabling control of said vehicle such that said vehicle initiates motion and navigates towards said group of geographical locations in accordance with said map; and retrieving, by said processor via said vehicle during travel in accordance with said map, video data associated with said group of said utility light apparatuses.

A third aspect of the invention provides a computer system comprising a processor coupled to a computer-readable memory unit, said memory unit comprising instructions that when executed by the processor executes a utility light malfunction determination method comprising: receiving , by said processor from a first hardware device, luminance data specifying current luminance levels associated with a plurality of utility light apparatuses; receiving, by said processor from said first hardware device, location data specifying a geographical location for each utility light apparatus of said plurality of utility light apparatuses; analyzing, by said processor, said luminance data and said location data with respect to historical luminance data and historical location data associated with said plurality of utility light apparatuses; determining, by said processor based on results of said analyzing, a group of utility light apparatuses of said plurality of said utility light apparatuses comprising first current luminance levels differing from previous luminance levels of said group of said utility light apparatuses retrieved from said historical luminance data; generating, by said processor, a list specifying a group of geographical locations associated with said group of said utility light apparatuses; generating, by said processor based on said list, a map comprising said group of geographical locations; transmitting, by said processor to a vehicle in response to said generating said map, a control signal enabling control of said vehicle such that said vehicle initiates motion and navigates towards said group of geographical locations in accordance with said map; and retrieving, by said processor via said vehicle during travel in accordance with said map, video data associated with said group of said utility light apparatuses.

The present invention advantageously provides a simple method and associated system capable of determining apparatuses in need of repair.

DETAILED DESCRIPTION

Figure 1:
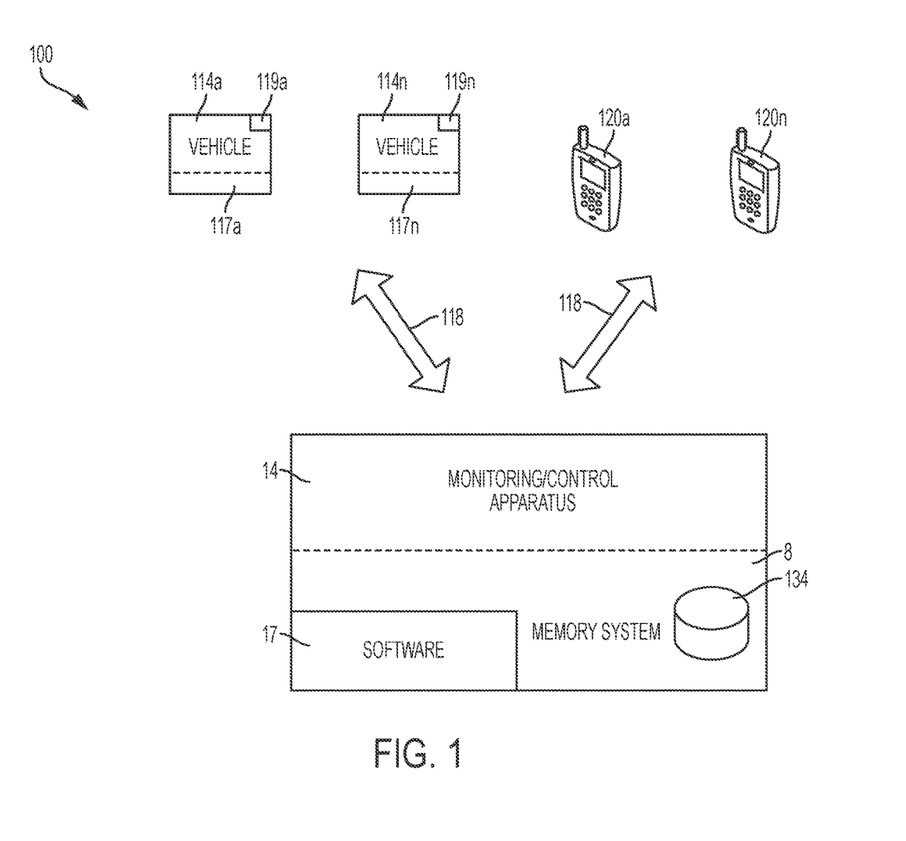
FIG. 1 illustrates a system for determining locations associated with utility light outages and remotely repairing the utility light outages, in accordance with embodiments of the present invention.

FIG. 1 illustrates a system 100 for determining locations associated with utility light outages and remotely repairing the utility light outages, in accordance with embodiments of the present invention. System 100 enables a process for managing light outages by:

1. Determining a vehicle trajectory path based on inferred location points to confirm possible utility light outages derived and analyzed via sensor data retrieved from vehicles, mobile devices, etc.
2. Enabling vehicles to confirm utility light outages (via the determined trajectory path) and provide possible recovery options via remotely controlled mechanical devices.

System 100 of FIG. 1 includes a vehicle monitoring/control apparatus 14 in communication with vehicles 114a . . . 114n (comprising utility light repair components 117a . . . 117n such as, inter alia, lightbulbs/LEDS, repaired circuitry, light sockets, etc.) and communication devices 120a . . . 120n via a wireless network 118. Communication devices 120a . . . 120n may comprise any type of communication devices including, inter alia, mobile/cellular phones, smart phones, PDAs, tablet computers, laptop computers, etc. Vehicles 114a . . . 14n (i.e., control hardware 119a . . . 119n internal to vehicles 114a . . . 114n) and vehicle monitoring/control apparatus 14 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, vehicles 114a . . . 114n (i.e., control hardware 119a . . . 119n internal to vehicles 114a . . . 114n vehicles) and monitoring/control apparatus 14 may each comprise a specialized hardware device comprising specialized (non-generic) hardware and circuitry (i.e., specialized discrete non-generic analog, digital, and logic based circuitry) for executing a process described with respect to FIGS. 1-3. The specialized discrete non-generic analog, digital, and logic based circuitry may include proprietary specially designed components (e.g., a specialized integrated circuit designed for only implementing an automated process for identifying and intercepting an unauthorized vehicle). Monitoring/control apparatus 14 includes a memory system 8, software 17, and control hardware 19 (all sensors and associated control hardware for enabling software 17 to execute a process for determining locations associated with utility light outages and remotely repairing the utility light outages). Control hardware 119a . . . 119n may include sensors. Sensors may include, inter alia, GPS sensors, RFID tag readers, video recording devices, optical sensors, bar code reader, etc. The memory system 8 may include a database 134 (e.g., comprising historical luminance data). The memory system 8 may include a single memory system. Alternatively, the memory system may include a plurality of memory systems. Each of vehicles 114a . . . 114n may comprise any vehicle that does not require a human operator to be located within the vehicles 114a . . . 114n such as, inter alia, a remote controlled vehicle (e.g., an aircraft flown by a pilot at a ground control station), an autonomously controlled vehicle (e.g., an aircraft controlled based on pre-programmed flight plans and may include an intelligence algorithm that would enable vehicles 114a . . . 114n to know it's location and self-determine a route deliver a package to a location dynamically), a pre-programmed vehicle, etc. Alternatively, vehicles 114a . . . 114n may comprise any type of vehicle that includes a human operator located within the vehicle (e.g., an aircraft, an automobile, a boat or ship, a train, etc.). Vehicles 114a . . . 114n may include, inter alia, an aerial vehicle, a land based vehicle, a marine (water) based vehicle, etc.

System 100 of FIG. 1 enables vehicles 114a . . . 114n and/or mobile devices 120a . . . 120n to collect sensor data values (e.g., associated with lighting and luminance levels and associated locations) from utility light structures during travel. The sensor data values are transmitted to monitoring/control apparatus 14. Monitoring/control apparatus 14 dynamically correlates and analyzes (in real time) the retrieved sensor data values with respect to historical sensor data values to infer possible utility (e.g., utility) light outages. Based on the inferences, vehicles 114a . . . 114n may be scheduled to travel to locations of the possible utility light outages to confirm the utility light outages. Each utility structure (comprising a utility light and utility pole) may be mapped to an associated geo-location and bar code using via any of vehicles 114a . . . 114n. If a bar code is missing from a utility pole then one of vehicles 114a . . . 114n may record an associated picture and geo-location. Additionally, system 100 may schedule any of vehicles 114a . . . 114n for monitoring the utility structures. Any detected utility light outages are recorded and associated data may be transmitted to a utility system for routing maintenance activity for repair. A travel path for the vehicles 114a . . . 114n may be optimized using a current operations research path and historical data for optimized routing. Detected utility light outages may be repaired via usage of camera based (manually and remotely controlled) robotic devices attached to vehicles 114a . . . 114n. Therefore, system 100 of FIG. 1 enables a process for scheduling a trajectory path for travel of vehicles 114a . . . 114n based on inferred location points associated with possible utility light outages derived and analyzed based on sensor data retrieved from vehicles 114a . . . 114n and/or mobile devices 120a . . . 120n. In response, vehicles 114a . . . 114n are instructed to confirm the possible utility light outages and provide possible recovery/repair options via usage of robotic control devices attached to vehicles 114a . . . 114n.

Figure 2:
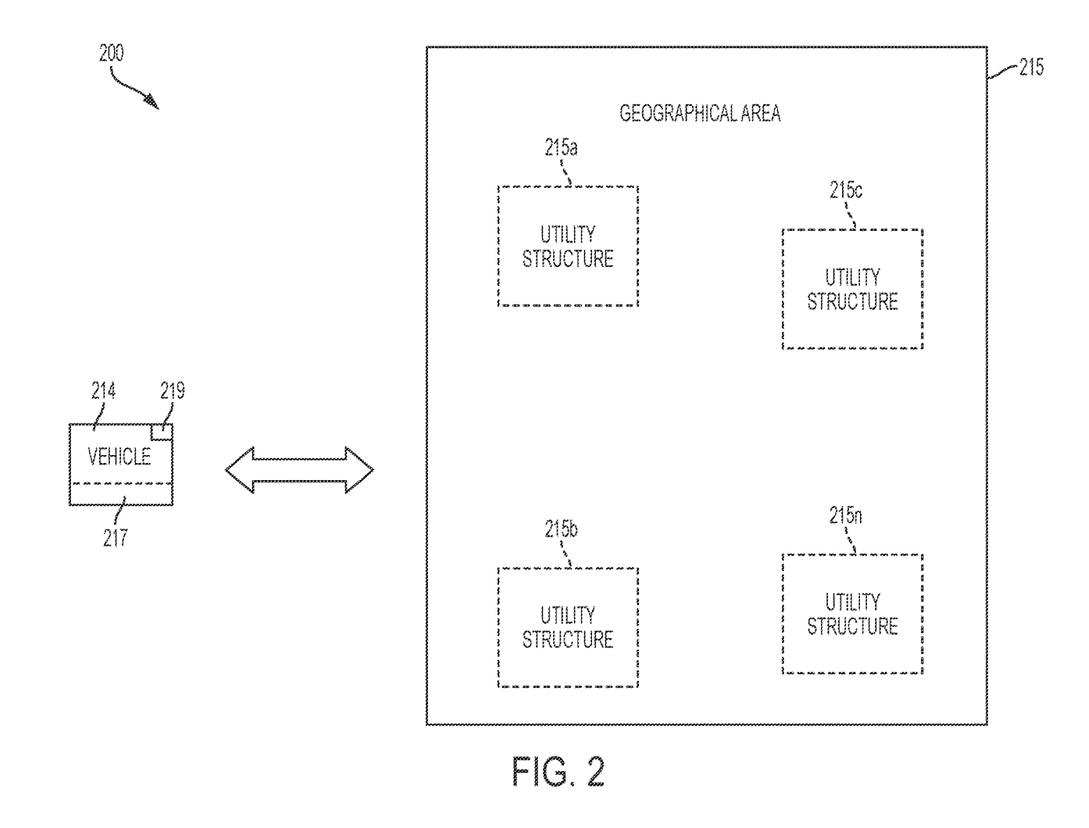
FIG. 2 illustrates a geographical area comprising various utility structures associated with a process for repairing the utility light outages with respect to a vehicle, in accordance with embodiments of the present invention.

FIG. 2 illustrates a geographical area 215 comprising various utility structures 215a . . . 215n associated with a process for repairing the utility light outages with respect to vehicle 214, in accordance with embodiments of the present invention. Vehicle 214 comprises control hardware 219 including sensors (e.g., GPS sensors, RFID tag readers, video recording devices, optical sensors, bar code reader, etc.). Additionally, vehicle 214 may be carrying utility light repair components 117a . . . 117n (e.g., lightbulbs/LEDS, repaired circuitry, light sockets, etc.) for executing a utility light repair process. Each of utility structures 215a . . . 215n comprises a utility pole securing a utility light (e.g., a pole comprising a street light) and an identification sensor such as a barcode sensor, and RFID tag, an NFC tag, a GPS sensor, etc. Geographical area 215 comprises utility structures 215a . . . 215n associated with a utility light inspection and repair process executed by system 100 of FIG. 1.

Figure 3:
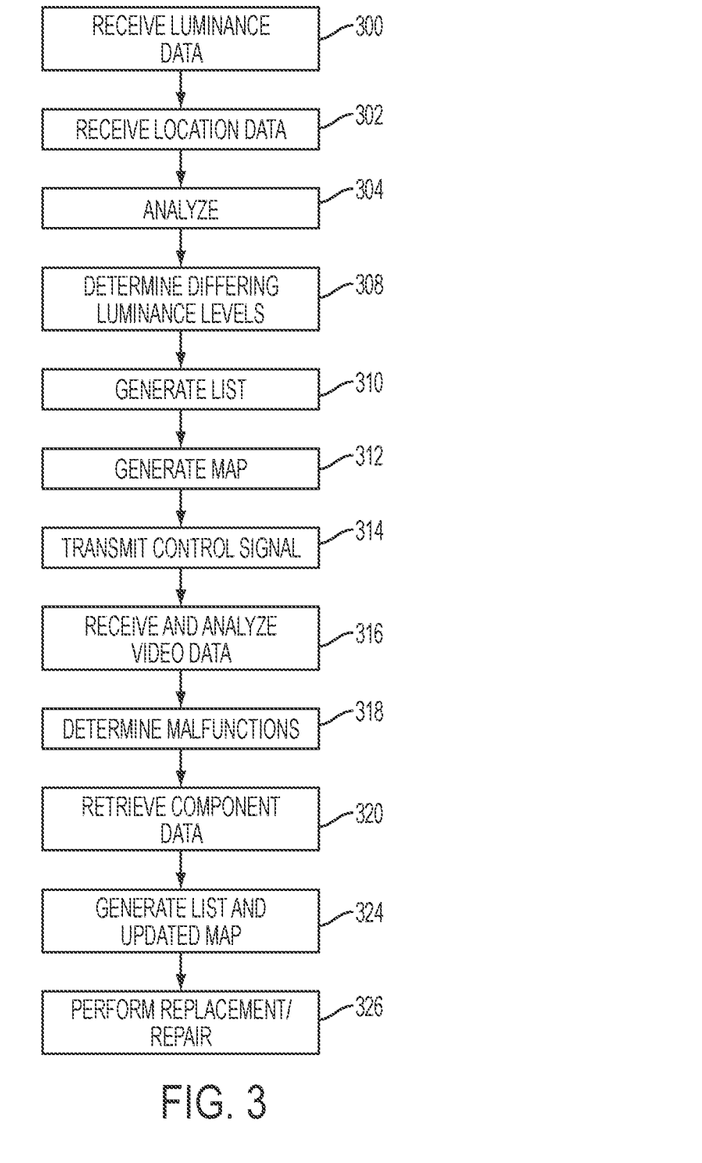
FIG. 3 illustrates an algorithm detailing a process flow enabled by the system of FIG. 1 for determining locations associated with utility light outages and remotely repairing the utility light outages.

FIG. 3 illustrates an algorithm detailing a process flow enabled by system 100 of FIG. 1 for determining locations associated with utility light outages and remotely repairing the utility light outages. Each of the steps in the algorithm of FIG. 3 may be enabled and executed in any order by a computer processor(s) or any type of specialized hardware executing computer code. In step 300, luminance data specifying current luminance levels (of lighting devices) associated with utility light apparatuses is received (by a monitoring apparatus) from a communication (hardware) device. In step 302, location data specifying a geographical location for each utility light apparatus is received. In step 304, the luminance data and location data is analyzed with respect to historical luminance data and historical location data (e.g., stored in a historical data database such as database 134 of FIG. 1) associated with the utility light apparatuses. In step 308, it is determined (based on the analysis of step 304) that a group of utility light apparatuses comprise first current luminance levels differing (e.g., less than) from previous luminance levels of the group of said utility light apparatuses retrieved from the historical luminance data. In step 310, a list specifying a group of geographical locations associated with the group of said utility light apparatuses is generated. In step 312, a map illustrating an optimized path for the group of geographical locations is generated based on the list. In step 314, a control signal is transmitted to a vehicle. The control signal enables control of the vehicle such that the vehicle initiates motion and navigates towards the group of geographical locations in accordance with the map. In step 316, video data associated with the group of said utility light apparatuses is retrieved via the vehicle during travel in accordance with the map. The video data is analyzed with respect to a maintenance schedule associated with the group of said utility light apparatuses. In step 318, a subgroup of utility light apparatuses is determined to comprise lighting device apparatus malfunctions. In step 320, component data identifying components for each utility light apparatus of the subgroup of utility light apparatuses is retrieved. In step 324, a list specifying a subgroup of geographical locations associated with the subgroup of utility light apparatuses is generated and a resulting updated map illustrating an optimized path for the subgroup of geographical locations is generated. In step 326, it is determined if defective components (e.g., illumination devices, control circuitry, etc.) of the subgroup of utility light apparatuses may be replaced via the vehicle. If it is determined that the defective components may be replaced via the vehicle, then multiple control signals are generated and transmitted to the vehicle. For example:

1. A first control signal is generated and transmitted to the vehicle. The first control signal enables control of the vehicle such that the vehicle initiates motion and navigates to retrieve replacement components for replacing the defective components.
2. A second control signal is generated and transmitted to the vehicle. The second control signal enables control of the vehicle such that the vehicle carrying the replacement components initiates motion and navigates (in accordance with the updated map) to each defective utility light apparatus for installation of the replacement components.

If it is determined that the defective components may be not replaced via the vehicle, then a repair order associated with the defective components is generated and transmitted to a service repair entity.

Figure 4:
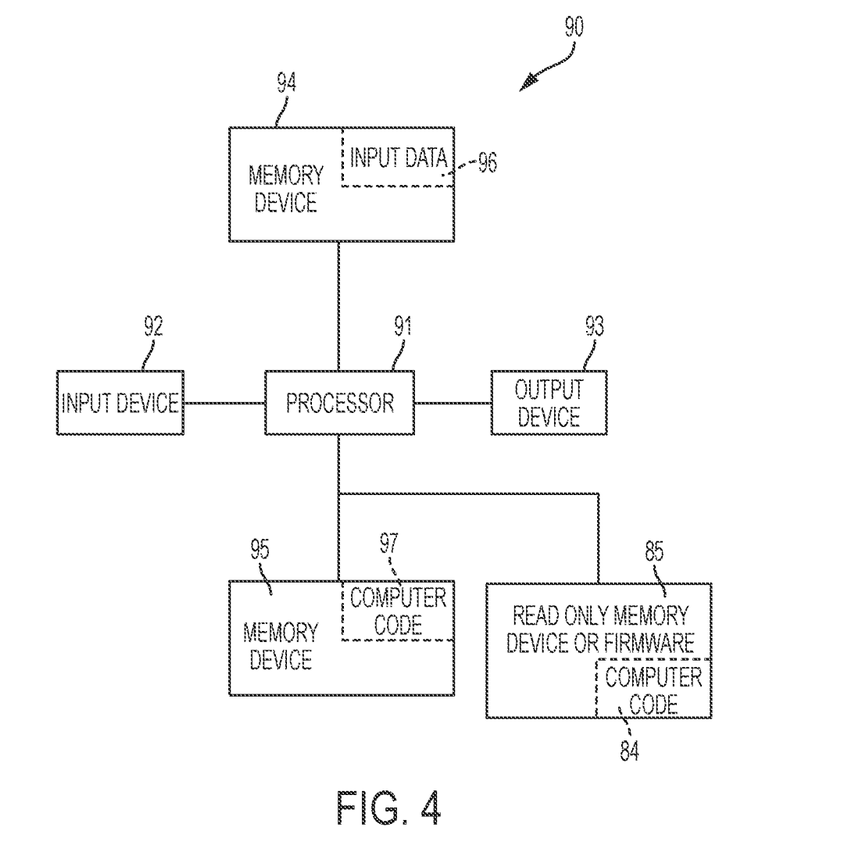
FIG. 4 illustrates a computer system used by the system of FIG. 1 for enabling a process for determining locations associated with utility light outages and remotely repairing the utility light outages, in accordance with embodiments of the present invention.

FIG. 4 illustrates a computer system 90 (e.g., control hardware 219 and 119a . . . 119n of vehicles 214, and 114a . . . 114n, respectively and monitoring/control apparatus 14) used by or comprised by the systems of FIG. 1 and FIG. 2 for enabling a process for determining locations associated with utility light outages and remotely repairing the utility light outages, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 3) for enabling a process for determining locations associated with utility light outages and remotely repairing the utility light outages. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 3) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithm) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to determine locations associated with utility light outages and remotely repairing the utility light outages. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for determining locations associated with utility light outages and remotely repairing the utility light outages. In another embodiment, the invention provides a business method that performs the process steps of the invention on a subscription, advertising, and/or fee basis. That is, a service supplier, such as a Solution Integrator, could offer to enable a process for determining locations associated with utility light outages and remotely repairing the utility light outages. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A utility light malfunction determination method comprising:
    receiving, by a processor of a computing device from a first hardware device, luminance data specifying current luminance levels associated with a plurality of utility light apparatuses;
    receiving, by said processor from said first hardware device, location data specifying a geographical location for each utility light apparatus of said plurality of utility light apparatuses;
    analyzing, by said processor, said luminance data and said location data with respect to historical luminance data and historical location data associated with said plurality of utility light apparatuses;
    determining, by said processor based on results of said analyzing, a group of utility light apparatuses of said plurality of said utility light apparatuses comprising first current luminance levels differing from previous luminance levels of said group of said utility light apparatuses retrieved from said historical luminance data;
    generating, by said processor, a list specifying a group of geographical locations associated with said group of said utility light apparatuses;
    generating, by said processor based on said list, a map comprising said group of geographical locations;
    transmitting, by said processor to a vehicle in response to said generating said map, a control signal enabling control of said vehicle such that said vehicle initiates motion and navigates towards said group of geographical locations in accordance with said map; and
    retrieving, by said processor via said vehicle during travel in accordance with said map, video data associated with said group of said utility light apparatuses.

2. The method of claim 1, further comprising;
    analyzing, by said processor, said video data;
    determining, by said processor based on results of said analyzing said video data, a subgroup of utility light apparatuses of said group of said utility light apparatuses comprising lighting device apparatus malfunctions;
    retrieving, by said processor, component data identifying components for each utility light apparatus of said subgroup of utility light apparatuses;
    generating, by said processor, a list specifying a subgroup of geographical locations of said group of geographical locations associated with said subgroup of utility light apparatuses;
    generating, by said processor based on said list, an updated map comprising said subgroup of geographical locations; and
    determining, by said processor based on said component data, if defective components of said subgroup of utility light apparatuses and associated with said lighting device apparatus malfunctions may be replaced via said vehicle.

3. The method of claim 2, wherein it is determined that said defective components of said subgroup of utility light apparatuses may not be replaced via said vehicle, and wherein said method further comprises:
    generating, by said processor, a repair order associated with said defective components of said subgroup of utility light apparatuses; and
    transmitting, by said processor, said repair order and said updated map to a service repair entity.

4. The method of claim 2, wherein it is determined that said defective components of said subgroup of utility light apparatuses may be replaced via said vehicle, and wherein said method further comprises:
    transmitting, by said processor to said vehicle, a first control signal enabling control of said vehicle such that said vehicle initiates motion and navigates to retrieve replacement components for replacing said defective components; and
    transmitting, by said processor to said vehicle in accordance with said updated map, a second control signal enabling control of said vehicle such that said vehicle carrying said replacement components initiates motion and navigates to each utility light apparatus of said subgroup of utility light apparatuses for installation of said replacement components.

5. The method of claim 2, wherein said analyzing said video data comprises analyzing said video data with respect to a maintenance schedule associated with said group of said utility light apparatuses.

6. The method of claim 1, wherein said defective components comprise components selected from the group consisting of illumination devices and control circuitry.

7. The method of claim 1, wherein said first current luminance levels are less than said previous luminance levels.

8. The method of claim 1, wherein said first hardware device comprises an optical sensor and a GPS device.

9. The method of claim 1, wherein each said utility light apparatus is mechanically attached to a utility pole, and wherein each said utility pole comprises an identification structure for identification of each said utility pole.

10. The method of claim 9, wherein each said identification structure comprises a structure selected from the group consisting of a bar code and an RFID tag.

11. The method of claim 1, wherein each said utility light apparatus comprises a street light for illuminating a street.

12. The method of claim 1, further comprising:
    providing at least one support service for at least one of creating, integrating, hosting, maintaining, and deploying computer-readable code in the control hardware, said code being executed by the computer processor to implement: said receiving said luminance data, said receiving said location data, said analyzing, said determining, said generating said list, said generating said map, said transmitting, and said retrieving.

13. A computer program product, comprising a computer readable hardware storage device storing a computer readable program code, said computer readable program code comprising an algorithm that when executed by a processor of a computing device implements a utility light malfunction determination method, said method comprising:

receiving, by said processor from a first hardware device, luminance data specifying current luminance levels associated with a plurality of utility light apparatuses;

receiving, by said processor from said first hardware device, location data specifying a geographical location for each utility light apparatus of said plurality of utility light apparatuses;

analyzing, by said processor, said luminance data and said location data with respect to historical luminance data and historical location data associated with said plurality of utility light apparatuses;

determining, by said processor based on results of said analyzing, a group of utility light apparatuses of said plurality of said utility light apparatuses comprising first current luminance levels differing from previous luminance levels of said group of said utility light apparatuses retrieved from said historical luminance data;

generating, by said processor, a list specifying a group of geographical locations associated with said group of said utility light apparatuses;

generating, by said processor based on said list, a map comprising said group of geographical locations;

transmitting, by said processor to a vehicle in response to said generating said map, a control signal enabling control of said vehicle such that said vehicle initiates motion and navigates towards said group of geographical locations in accordance with said map; and retrieving, by said processor via said vehicle during travel in accordance with said map, video data associated with said group of said utility light apparatuses.

14. The computer program product of claim 13, wherein said method further comprises:

analyzing, by said processor, said video data;

determining, by said processor based on results of said analyzing said video data, a subgroup of utility light apparatuses of said group of said utility light apparatuses comprising lighting device apparatus malfunctions;

retrieving, by said processor, component data identifying components for each utility light apparatus of said subgroup of utility light apparatuses;

generating, by said processor, a list specifying a subgroup of geographical locations of said group of geographical locations associated with said subgroup of utility light apparatuses;

generating, by said processor based on said list, an updated map comprising said subgroup of geographical locations; and determining, by said processor based on said component data, if defective components of said subgroup of utility light apparatuses and associated with said lighting device apparatus malfunctions may be replaced via said vehicle.

15. The computer program product of claim 14, wherein it is determined that said defective components of said subgroup of utility light apparatuses may not be replaced via said vehicle, and wherein said method further comprises:

generating, by said processor, a repair order associated with said defective components of said subgroup of utility light apparatuses; and transmitting, by said processor, said repair order and said updated map to a service repair entity.

16. The computer program product of claim 14, wherein it is determined that said defective components of said subgroup of utility light apparatuses may be replaced via said vehicle, and wherein said method further comprises:

transmitting, by said processor to said vehicle, a first control signal enabling control of said vehicle such that said vehicle initiates motion and navigates to retrieve replacement components for replacing said defective components; and transmitting, by said processor to said vehicle in accordance with said updated map, a second control signal enabling control of said vehicle such that said vehicle carrying said replacement components initiates motion and navigates to each utility light apparatus of said subgroup of utility light apparatuses for installation of said replacement components.

17. The computer program product of claim 14, wherein said analyzing said video data comprises analyzing said video data with respect to a maintenance schedule associated with said group of said utility light apparatuses.

18. The computer program product of claim 13, wherein said defective components comprise components selected from the group consisting of illumination devices and control circuitry.

19. The computer program product of claim 13, wherein said first current luminance levels are less than said previous luminance levels.

20. A computer system comprising a processor coupled to a computer-readable memory unit, said memory unit comprising instructions that when executed by the processor executes a utility light malfunction determination method comprising:

receiving, by said processor from a first hardware device, luminance data specifying current luminance levels associated with a plurality of utility light apparatuses;

receiving, by said processor from said first hardware device, location data specifying a geographical location for each utility light apparatus of said plurality of utility light apparatuses;

analyzing, by said processor, said luminance data and said location data with respect to historical luminance data and historical location data associated with said plurality of utility light apparatuses;

determining, by said processor based on results of said analyzing, a group of utility light apparatuses of said plurality of said utility light apparatuses comprising first current luminance levels differing from previous luminance levels of said group of said utility light apparatuses retrieved from said historical luminance data;

generating, by said processor, a list specifying a group of geographical locations associated with said group of said utility light apparatuses;

generating, by said processor based on said list, a map comprising said group of geographical locations;

transmitting, by said processor to a vehicle in response to said generating said map, a control signal enabling control of said vehicle such that said vehicle initiates motion and navigates towards said group of geographical locations in accordance with said map; and retrieving, by said processor via said vehicle during travel in accordance with said map, video data associated with said group of said utility light apparatuses.

\* \* \* \* \*